Feb. 21, 1950

C. DEISS 2,498,031

CHAIN MAKING MACHINE

Filed March 27, 1945

INVENTOR
Charles Deiss
BY Barlow & Barlow
ATTORNEYS

Feb. 21, 1950           C. DEISS           2,498,031

CHAIN MAKING MACHINE

Filed March 27, 1945           5 Sheets-Sheet 2

INVENTOR
Charles Deiss
BY Barlow & Barlow
ATTORNEYS

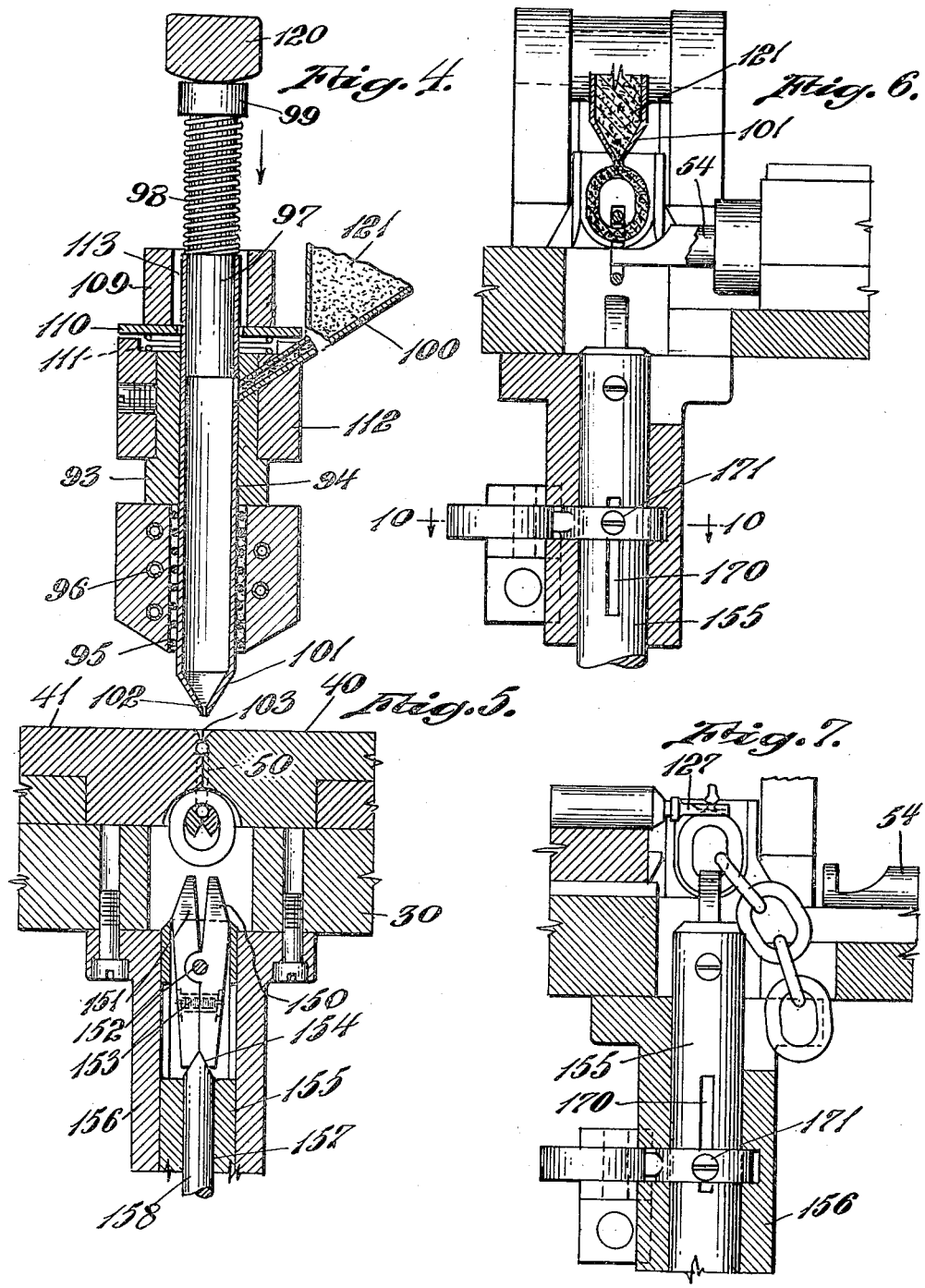

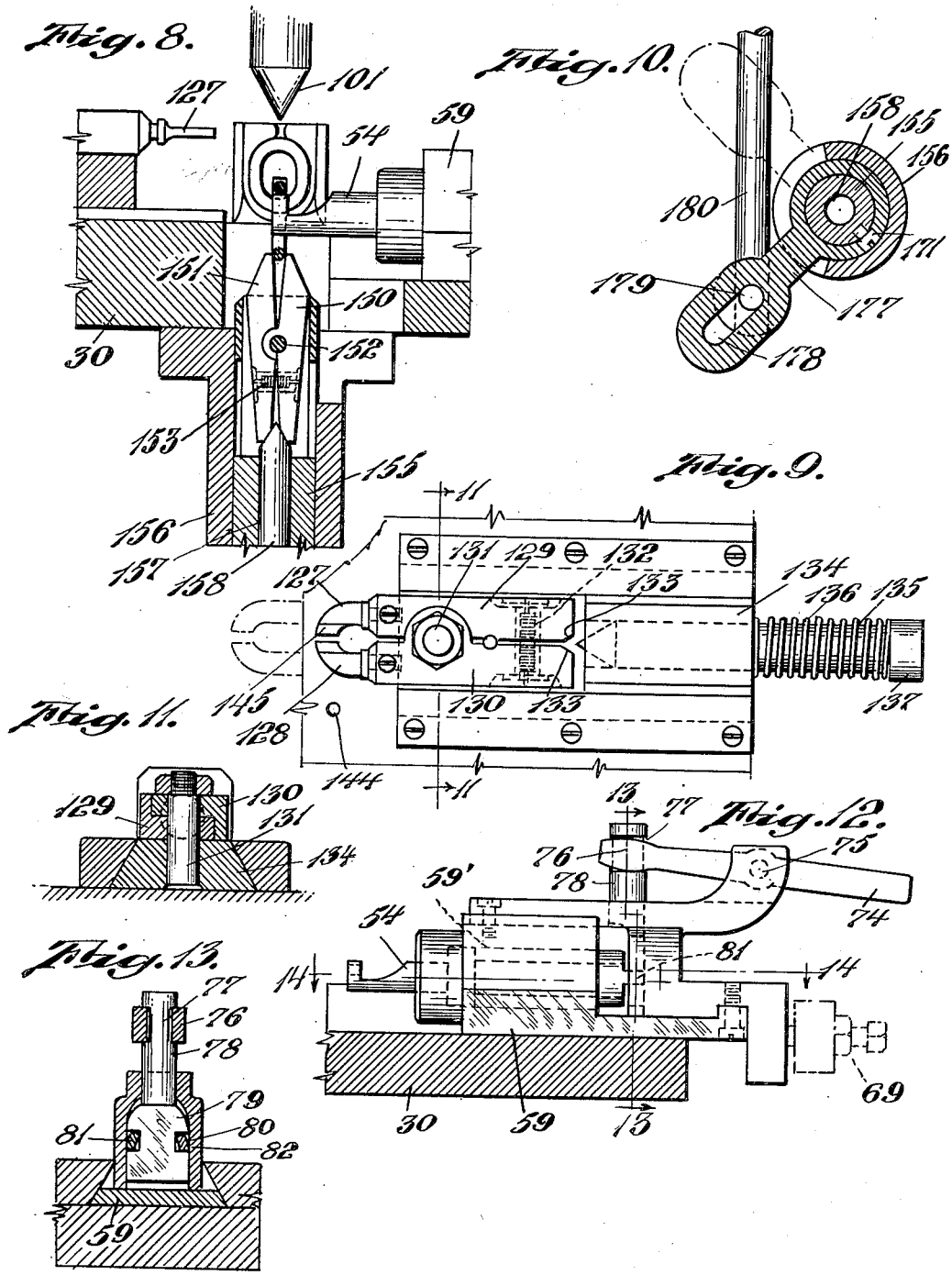

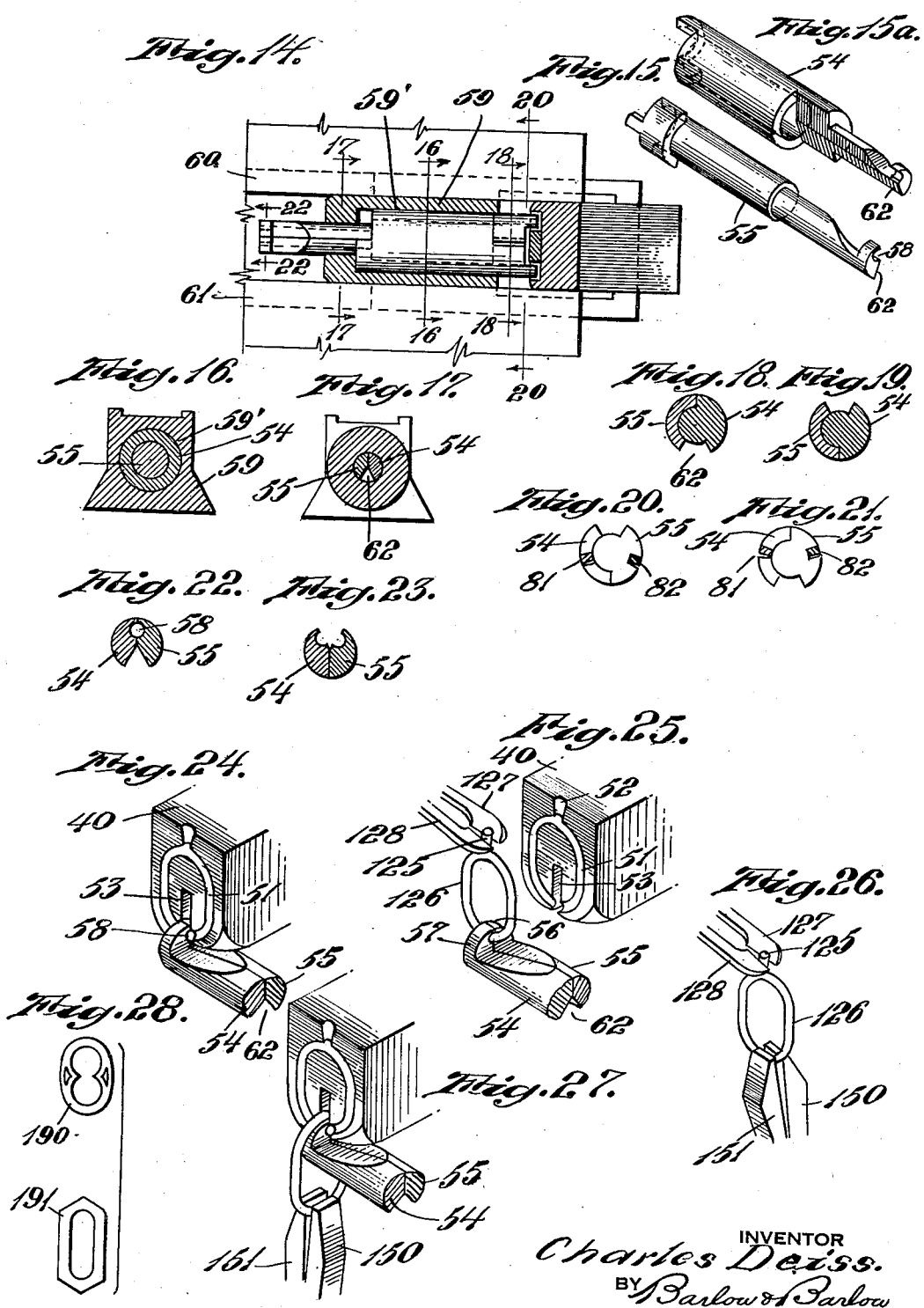

Patented Feb. 21, 1950

2,498,031

UNITED STATES PATENT OFFICE 2,498,031

CHAIN MAKING MACHINE

Charles Deiss, Swansea, Mass.

Application March 27, 1945, Serial No. 585,069

9 Claims. (Cl. 18—30)

This invention relates to a machine for making chain by molding or casting each link individually through a previously formed link.

One of the objects of this invention is to provide a machine so that it is merely necessary to load the machine with the material to be molded and the chain will emerge from the machine.

Another object of this invention is to provide an automatic machine using an injection molding process for forming each individual link of the chain through a previously formed link.

Another object of this invention is to provide several operations taking place automatically in a predetermined sequence by which the chain may be formed automatically in continuous lengths.

Another object of this invention is to provide several different sequential operations governed by cams from simultaneously operating cam shafts.

More specifically an object of this invention is to provide a plurality of members which cooperate to provide a die in which the injection molding takes place with the die parts so that they will support the previous link and also complete the main die in providing a through passage through the previously formed link.

With these and other objects in view, the invention consists of certain novel features of construction, as will be more fully described and particularly pointed out in the appended claims.

In the accompanying drawings:

Fig. 3 is a fragmental view showing means for heating the moldable material;

Fig. 4 is a sectional view showing a fragmental portion of the hopper for the moldable material and its injecting means;

Fig. 5 is a section illustrating the mold ready to receive the injecting means and also illustrating gripping means for a formed link which serves to turn the link 90°;

Fig. 6 is a section substantially at right angles to Fig. 5 illustrating the injecting means as in contact with the mold;

Fig. 7 is a sectional view substantially on the same line as Fig. 6 showing the parts in different relative positions;

Fig. 8 is a sectional view illustrating the relative positions of two of the gripping means and part of the mold and the injecting means;

Fig. 9 is a top plan view of the gripping means for the gate;

Fig. 10 is a section on line 10—10 of Fig. 6;

Fig. 11 is a section on line 11—11 of Fig. 9;

Fig. 12 is an elevation of the mold completing means;

Fig. 13 is a section on line 13—13 of Fig. 12;

Fig. 14 is a sectional view on line 14—14 of Fig. 12;

Fig. 15 is a perspective view of one of the members shown in Fig. 14;

Fig. 15a is a perspective view of the member mating therewith;

Fig. 16 is a section on line 16—16 of Fig. 14;

Fig. 17 is a section on line 17—17 of Fig. 14;

Figs. 18 and 19 are sections on line 18—18 showing different positions of the parts shown;

Figs. 20 and 21 are sections on line 20—20 showing different positions of the parts shown;

Figs. 22 and 23 are sections on line 22—22 showing different positions of these parts;

Fig. 24 is a perspective view illustrating one part of the main body of the mold and the completing members of the mold in one relative position;

Fig. 25 is a perspective view illustrating the gripping and cutting member as engaging the gate of the formed link and one of the main mold parts as receding from the link, the same being held by the auxiliary members of the mold;

Fig. 26 is a perspective view illustrating the mold members as having disengaged the formed link and a pair of grippers engaging the link at the location where the auxiliary mold members previously were;

Fig. 27 is a perspective view illustrating the upper gripping members as having cut through the gate and the lower gripping members as having been turned through 90° and then lowered with the auxiliary mold members and one main mold member again being repositioned for casting of another link;

Fig. 28 illustrates two alternative forms of link which may be cast by appropriately shaping the mold parts which go to form the link.

Figure 1:
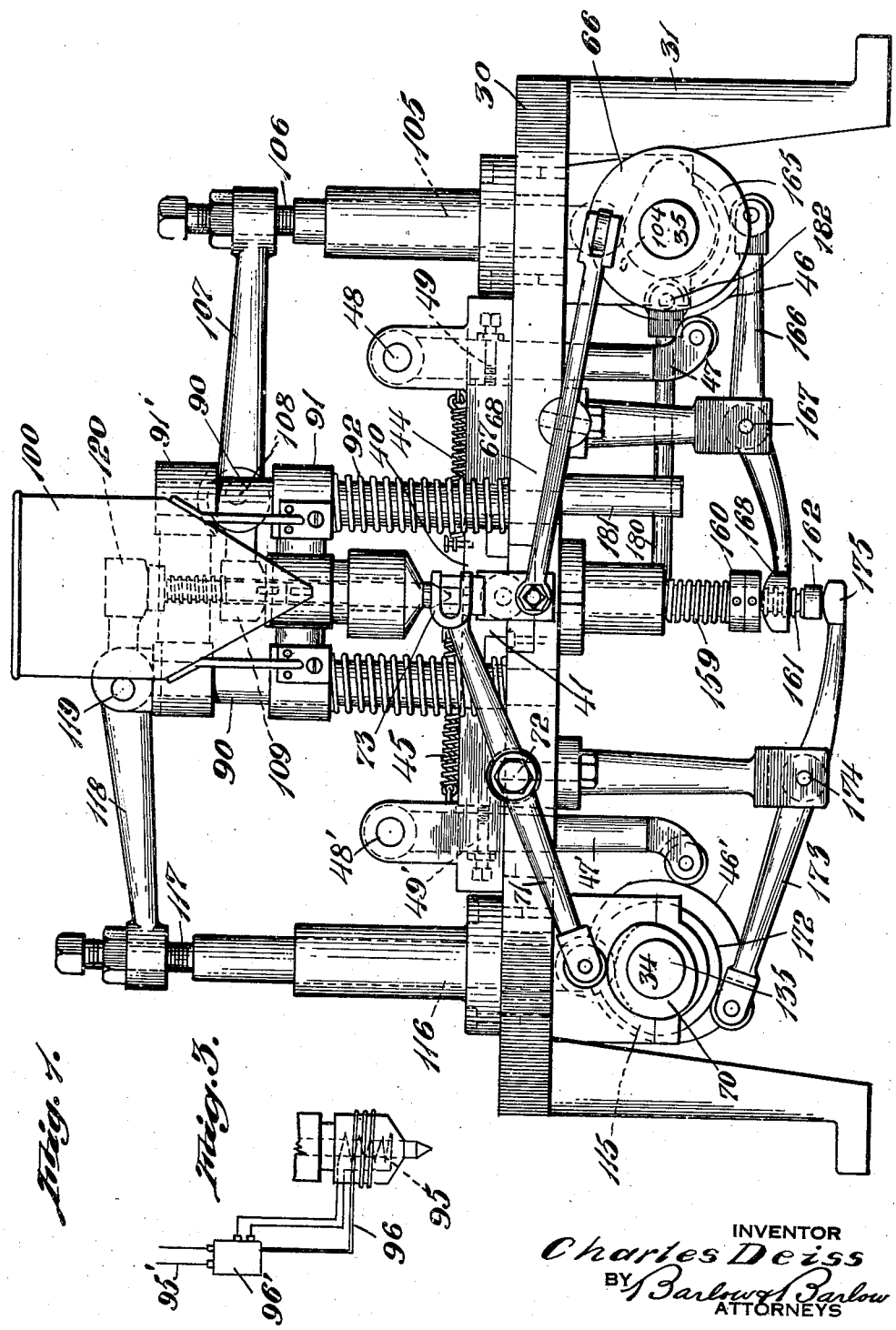
Fig. 1 is a front elevation of the machine.

In proceeding with this invention I have provided a table or bed supported on legs which in turn serves as a mounting for all of the various working parts of the machine. The formation of chain is substantially central of the machine. The mold is formed of two main sections which slide toward and from each other along a supporting surface of the machine. Supplementary auxiliary members which complete the molds, slide on the bed of the machine from the front to said point of formation and there cooperate with the main mold for completing the cavity.

From above an injector is moved toward and from the mold to interlock with the mold and inject moldable material into the mold. From the rear of the machine grippers advance toward and from the center of action to grip the gate of the formed link and suspend it while the mold completing members are removed from position and from below in opposed relation to the injecting member other grippers advance to grip the chain link and serve to turn it to 90° and lower it to a position so that the mold cavity will extend through it for the molding of a subsequent link. All of these various movements take place in sequence due to the operation from two cam shafts which actuate the various parts. The two cam shafts are driven in unison from a main drive shaft at the back of the machine. Some heating means is used to keep the plastic material molten until injection takes place. The general sequence of formation is shown in Figs. 24 to 26 inclusive in the drawings.

Figure 2:
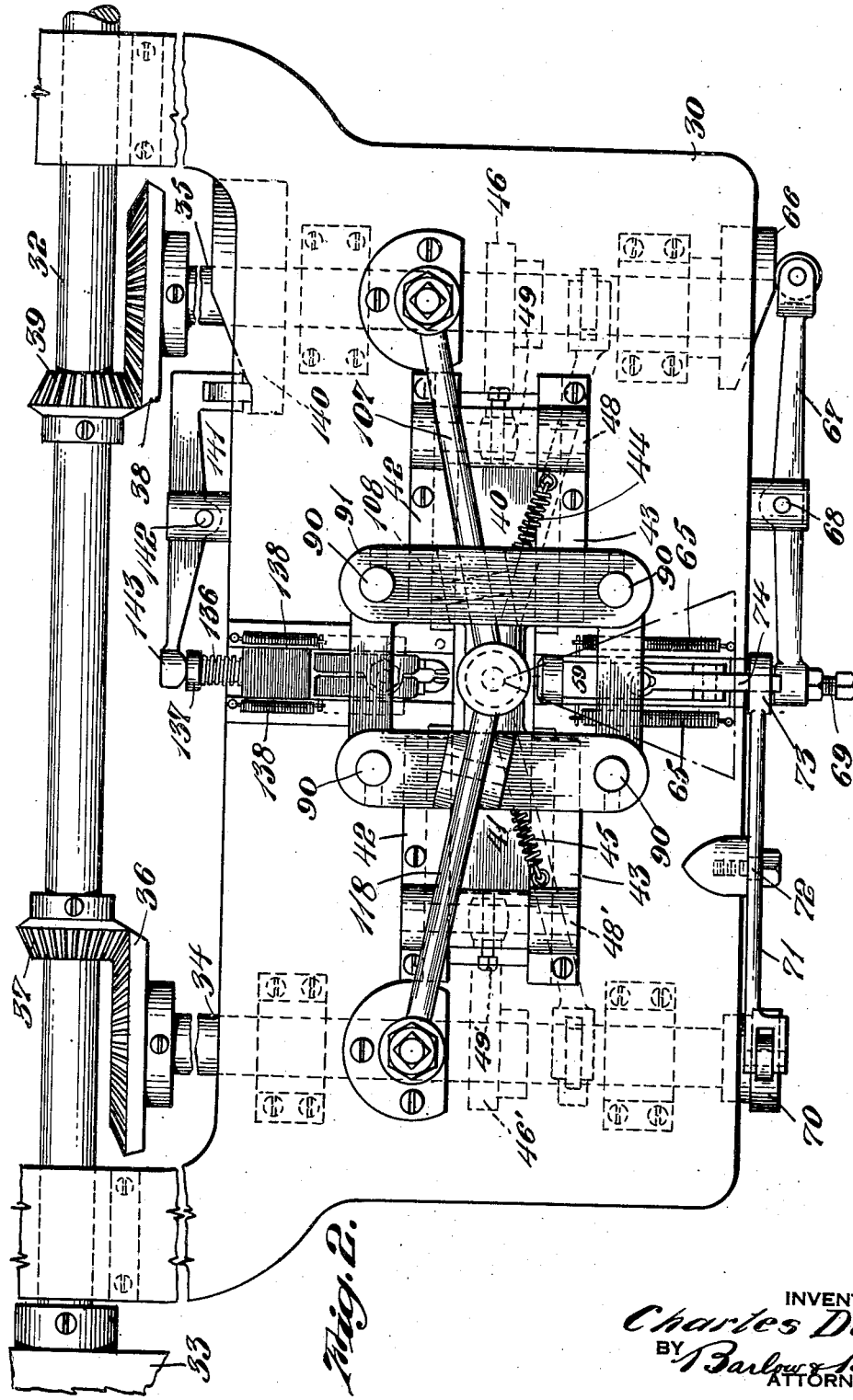
Fig. 2 is a plan view of the machine with the hopper removed.

With reference to the drawings, particularly Figs. 1 and 2, 30 designates the bed of the machine which is supported on legs 31. The main drive shaft is designated 32 which receives its power from some suitable source as a pulley 33 and in turn drives the cam shafts 34 and 35 by means of beveled gears 36 and 37 and 38 and 39. Various cams on these two shafts serve as the actuating means for all of the various motions which are present in the machine. The position of the cams serve to provide the desired timing for the operation of the various parts.

The mold for the link is formed of two main sections 40 and 41 (see Figs. 2 and 5) which are substantially duplicate sections and are mounted to slide in guides 42 and 43 on either side of the center of the machine. The die 40 is drawn outwardly from the center of the machine by a spring 44 and the die 41 is drawn outwardly from the center of the machine by a spring 45. The mold section 40 is actuated by a cam 46 on shaft 35 through lever 47 pivoted as at 48 with reference to which the section 40 is adjustably coupled by the adjustment 49. Section 41 is similarly actuated simultaneously from the shaft 34 through cam 46', lever 47', pivoted as 48' and adjustably connected through the adjustment 49' to the mold section 41. These mold sections move toward each other into engagement at parting line 50 as shown in Fig. 5.

Each of these sections 40 and 41 are recessed as at 51 in the form of a substantially closed loop as shown in Fig. 25, there being a recess 52 to provide a gate for the entrance of the plastic to be molded. There is also a recess 53 in the face of each section which interrupts the recess 51 from being continuous and in order to complete or close the recess and form it continuous I provide two members 54 and 55 shaped as shown in Fig. 25 one fitting inside of the other and each having an upstanding end as 56 or 57 to extend into the recesses 53 and provide between them, when in the position shown in Fig. 24, an opening 58 which will compete the recess 51 between the members 40 and 41 making it endless. Members 54 and 55 are shaped as shown in Figs. 15, 15a and are together mounted in the bore 59' of a slide 59 (see Fig. 14) which has a dovetail base which is guided for movement from the front toward the center of the machine in guides 60 and 61 with portions 56, 57 beyond one end of the bore and portions extending beyond the other end of the bore for manipulation. The members 54 and 55 are cut away as at 62 for relative rocking so that the two parts which form opening 58 as shown in Fig. 24 may be spread apart at certain times in their operations.

The slide 59 is moved outwardly from the center of the bed by springs 65 (see Fig. 2) and is moved inwardly by cam 66 at the end of shaft 35 operating through lever 67 pivoted as at 68 and having an adjustable abutment 69 to press against the slide for moving the same inwardly to position. In order to rock the members 54 and 55 relative to each other within the bore 59' as shown in Fig. 16 I provide a cam 70 (Fig. 2) on the cam shaft 34 to manipulate a lever 71 pivoted as at 72 and having a U-shaped end 73 engaging a lever 74 which is pivoted as at 75 (see Fig. 12) and has a U-shaped end 76 to extend into recess 77 (also Fig. 13) in the plunger 78 which has a head 79 notched as at 80 to engage the arms 81 and 82 (see also Figs. 20 and 21) which are provided on the members 54 and 55 so as to rock these members one about the other.

The injection of the plastic material comprises a construction consisting of four upstanding posts 90 which are secured together at their upper ends by a frame work 91' and upon these posts there is slidingly mounted a head 91, which head is moved upwardly by springs 92 encircling each of the posts 90 and reacting between it and the bed. This head comprises a pair of yokes extending between the forward and rearward posts with a cross piece extending between the two yokes connecting them together and which is provided with a central boss 112 which carries a casing of a thick wall metal 93 containing tube 94 therein. Resistance wires 95 in a coil about the sleeve 94 are controlled by a thermostatic tube 96 in a coil about the tube from a suitable source 95' through box 96 as shown schematically in Fig. 3 for maintaining these portions at a temperature. A plunger 97 having a spring 98 engaging a head 99 thereof and also engaging the sleeve 94 serves to retract and maintain the plunger outwardly of the sleeve 94. A hopper 100 is filled with granules of plastic material to be fed into the sleeve 94 below the plunger 97. The sleeve 94 is provided with an ejecting nozzle tapered at 101 which has an opening 102, the taper is such as to fit into a flare 103 in the mold section 40 and 41.

The head 91 is moved downwardly by a cam 104 (see Fig. 1) acting through slide 105 on the adjustable abutment 106 carried by lever arm 107 and pivoted at 108 so that its end portion 109 will act upon a plate 110 (see Fig. 4) and through spring 111 upon the boss 112 which mounts casing 96 on the head 91. The end portion 109 has an opening 113 therein through which the plunger and upper end of the sleeve 94 pass. This cam 104 serves to move the tapered portion 101 into the mouth 103 to make a snug fit therewith after which cam 115 (see Fig. 1) acting through plunger 116 and engaging the abutment screw 117 carried by lever 118 pivoted as 119 acts to have its end portion 120 (see also Fig. 4) press upon the head 99 and force the plunger 97 downwardly to eject the plastic material 121 into the recess 52, 51, 58 to fill the same. Immediately that this injection has been made the levers 107 and 118 rock upwardly to permit the plunger 97 to rise and the head 91 with its casing 93 to rise. The injection leaves a small gate portion 125 on the link which has been formed designated 126 (Fig. 25).

After this link is cast the mold sections 40 and 41 move away from the link leaving the link held by the auxiliary mold members 54 and 55. At this point grippers 127 and 128 (shown in Fig. 25 and more fully in Figs. 9 and 11) move forwardly from the rear to grip the gate portion 125. The portions 127 and 128 are the ends of levers 129 and 130 pivoted at 131 and drawn together at their rear ends by spring 132. The ends of the levers are flared at the ends of the surfaces adjacent each other as at 133 and are movable as a unit in slide 134. This slide, however, has a plunger 135 with a spring 136 engaging the head 137 of the plunger to force the same outwardly of the slide. Springs 138 draw the slide outwardly as a unit. A cam 140 on cam shaft 35 operates through lever 141 pivoted at 142 and having its end portion 143 engaging the head 137 of this plunger. The spring 136 has greater force than the springs 138 and consequently the first movement in response to this lever 141 is to move the slide 134 inwardly with the jaws 127 and 128 open until they arrive at a position embracing the gate 125 (see Fig. 25) whereupon the slide meets a stop 144 which arrests the motion of the slide and then as lever 141 continues to press the plunger 135 inwardly the spring 136 will flex and the plunger point will engage the V-opening 133 at the end of the levers 129 and 130 and thus cause these levers to move toward each other to grip the gate 125. The edges 145 of the jaws 127 and 128 are rather sharp but at a point short of severing, a flat surface on the cam will hold the jaws so that they will grip the gate 125 but not sever it. However, a further raised portion on this cam 140 at some later point in the cycle will cause plunger 135 to move the jaws snugly together in contact and cut off the gate 125.

While the jaws 127 and 128 are holding the cast link 126 the members 54 and 55 are rocked to release the link 126 and are then withdrawn from the link by the spring 65. Thereupon the jaws 150 and 151 (see Fig. 6) move upwardly from beneath the bed plate 30 to grip the link 126. After these jaws grip the link and the jaws 127 and 128 sever the gate 125, the jaws 150 and 151 turn through 90° and move downwardly. The jaws 150 and 151 are pivotally related as 152 and a spring 153 serves to open their gripping ends by drawing the portions of the jaws on the other side of the pivot toward each other. The jaws are beveled as at 154 so that when in engagement a V slot is formed. The jaws are carried in a slide 155 movable vertically in a cylinder 156. The slide has a bore 157 in which a pin 158 is slidably mounted. Slide 155 is moved outwardly by spring 159 (see Fig. 1) engaging the head 160 of the slide while the member 158 is moved outwardly by spring 161 engaging the head 162 thereof. A cam 165 operates lever 166 which is pivoted at 167 with its operating end 168 in the form of a U to engage the head 160 of the slide 165 which moves the slide upwardly while the jaws 150 and 151 are open to a position such as shown in Fig. 8 where movement of the jaws is stopped, such for instance as by means of the end of slot 170 engaging a pin 171. Thereupon cam 172 actuates lever 173 pivoted as at 174 and has an actuating end 175 to engage the head 162 of plunger 158 to force the same inwardly through the slide 155 so as to enter the notch 154 and thus spread this end of the jaws causing the other end to grip the link 126 and hold the same tightly. As soon as this operation is performed the cutters 127 and 128 cut off the gate. The link so gripped is then turned through substantially 90° and then lowered to a position where it will be engaged by the upper edges 56, 57 of the members 54, 55 so that this portion of these members will engage the inner surface of the link which is formed. In order to turn the grippers 150 and 151 the slide 155 is provided with an arm 177 (see Fig. 10) which is slotted as at 178 for the reception of a pin 179 carried by a rod 180, which rod slides through a suitable support 181 (see Fig. 1). The arm 177 may be moved through 90° of arc from the full line position shown in Fig. 10 to the dotted line position shown in Fig. 10 by movement of the rod 180 and the pin 179 which extends from this rod into the opening 178. The movement of this rod is accomplished positively by having a follower 182 extending into a recess in the cam carried upon the shaft 135.

*Operation*

From the foregoing it will be apparent, assuming a link is cast in a mold that the main mold portions 40, 41 move away from the link while the link is supported by auxiliary portions 54, 55 of the mold at the lower edge thereof. Gripping members 127 and 128 move forward and grasp the gate of the link and the auxiliary portions of the mold 54 and 55 open and free the link and move away from the link. Grippers 150 and 151 grasp the link and then the members 127 and 128 are further actuated to cut the gate from the link formed. The grippers 150, 151 then turn through 90° of arc and lower the link to position it in a location so that part of the link will enter the recesses 53 in the main mold 40, 41 when these parts are closed. As these grippers 150, 151 lower the link, the members 54 and 55 move inwardly to enter this link and support it then the main part of the mold 40, 51 closes in to cooperate with the portions 54, 55 to complete the mold. Then the levers 118 and 107 operate to move the injecting mechanism down to the mold and inject sufficient plastic to fill the mold and the gate which is formed in this operation, after which the main portion of the mold separates leaving the cast link held by the members 54, 55 and the operations are repeated. The links as formed move to one side as they are released by the grippers 150 and 151 which move downwardly so as to pass downwardly beneath the bed plate out of the machine as shown in Fig. 7.

The machine which has been described may be used for providing links of any shape which may be molded, such for instance as the shape shown at 190 and 191 in Fig. 28 where the cross section of the link may vary at different points along its extent. As will be apparent, the machine may be used for molding any material which may be injected as heretofore illustrated. The machine is particularly adapted for molding a plastic material of the several varieties which are at present available on the market.

While the machine is shown automatic in its operation, it is also apparent that a mold such as indicated in Figs. 25 to 27 including the two pairs of parts, one of which may support the formed link while the other pair of parts of the mold are separated, may be utilized in hand mechanisms where complete automatic operation is not required but the advantages of using a part of the mold to support a previously formed link and also act as a part of the mold for the link to be formed is of advantage.

I claim:

1. In a chain machine, a mold for a chain link comprising a plurality of parts mounted for movement from and toward each other into firm engagement so as to provide a closed cavity for molding a link, means for injecting material into said mold to form a link and a gate extending therefrom, severing means separate of the mold parts mounted for movement toward the gate of the link formed for engaging the gate to support the link after separation of said mold parts, holding means for engaging the link for further manipulation of the link, means for actuating the severing means to sever the gate of the link formed, and means for thereafter operating the holding means for further moving the link.

2. In a chain machine, a mold for a chain link comprising a plurality of parts mounted for movement from and toward each other into firm engagement said mold having an encircling closed cavity for molding a link, means for injecting material into said mold to form a link, means for separating certain of said mold parts from the link formed, holding means movable for engaging and retaining the link formed in position for further manipulation thereof, means for separating the remaining mold parts from said link, means for engaging and movable for positioning the link to be at a location so that the cast portion passes at an angle to the plane of and within the encircling portion of the closed cavity of said mold when said mold parts are moved toward each other to have a subsequently formed link molded therethrough.

3. In a chain machine, a mold for a chain link comprising a plurality of parts mounted for movement from and toward each other into firm engagement so as to provide a closed cavity for molding a link, means for injecting material into said mold to form a link and a gate extending therefrom, means for separating certain of said mold parts from the link formed, holding means movable for engaging the gate of the link formed for holding the link formed in position for further manipulation thereof, said holding means comprising a severing means, means for separating the remaining mold parts from said link, means for engaging and movable for positioning the link to be at a location so that the cast portion passes at an angle to the plane of and within the encircling portion of the closed cavity of said mold when said mold parts are moved toward each other to have a subsequently formed link molded therethrough, said severing means being operable for severing the gate of the link subsequent to the engaging of the link by the positioning means and prior to the movement of the positioning means for positioning the link to a location to be within the confines of the close cavity.

4. In a chain machine, a mold having an annular cavity therein for forming a chain link of loop shape with open center, the cavity forming portion of the mold comprising two relatively movable sections forming part of the cavity and two relatively movable members forming the remainder of the cavity, means for injecting material into the mold, means for relatively moving the sections to leave a cast link held by the members, means for moving the members to release the link, means to transfer a cast link from said members to a removed position and at an angle to the plane of said cavity, and means to return said sections and members to form the mold with the cavity thereof extending through the open center of a previously cast link.

5. In a chain machine as in claim 4 wherein the link cast has a gate cast therewith and said means to transfer engages and removes said gate.

6. In a chain machine as in claim 4 wherein said sections are movable toward and from each other in a straight line and said members are mounted for a pivotal movement toward and from each other.

7. In a chain machine, a mold having an annular cavity therein for forming a chain link, comprising two sections forming part of the cavity and two members forming the remainder of the cavity, means for moving said sections and members to and from assembled relation for forming said cavity, and means for injecting material into said mold, said members being mounted for pivotal movement about an axis in the plane of the cleavage line of the sections for separation thereof from the formed link.

8. In a chain machine, a mold having an annular cavity therein for forming a chain link, comprising two sections forming part of the cavity and two members forming the remainder of the cavity, means for moving said sections and members to and from assembled relation for forming said cavity, and means for injecting material into said mold, said members being for a portion of their length, parts of a cylinder and relatively rotatable in a common bearing about a common axis which is in the plane of the cleavage line of the sections.

9. In a chain machine, a mold having an annular cavity therein for forming a chain link, comprising two sections forming part of the cavity and two members forming the remainder of the cavity, means for reciprocating said sections toward and from engagement with each other and means for rotating said members about a common axis which is in the plane of the cleavage line of the sections to and from assembled relation with said members for forming said cavity, and means for injecting material into said mold.

CHARLES DEISS.

REFERENCES CITED

The following references are of record in the file of this patent:

UNITED STATES PATENTS

| Number | Name | Date |
|---|---|---|
| 843,977 | Traum | Feb. 12, 1907 |
| 2,102,328 | Morin et al. | Dec. 14, 1937 |
| 2,248,580 | Morin et al. | July 8, 1941 |
| 2,363,801 | Morin | Nov. 28, 1944 |
| 2,367,303 | Morin | Jan. 16, 1945 |
| 2,367,962 | Reibold et al. | Jan. 23, 1945 |
| 2,393,549 | McCreery | Jan. 22, 1496 |
| 2,403,739 | Morin | July 9, 1946 |